(12) United States Patent
Masuda et al.

(10) Patent No.: US 7,815,005 B2
(45) Date of Patent: Oct. 19, 2010

(54) MOTORCYCLE SWINGARM ASSEMBLY

(75) Inventors: Yoshihiro Masuda, Akashi (JP); Taku Goda, Akashi (JP); Hiroshi Tomomori, Akashi (JP); Hayato Iwasaki, Akashi (JP); Hideyuki Ogishi, Akashi (JP); Hideki Kumamoto, Akashi (JP); Akiyoshi Mizuta, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 26 days.

(21) Appl. No.: 11/829,254

(22) Filed: Jul. 27, 2007

(65) Prior Publication Data

US 2008/0053732 A1  Mar. 6, 2008

(30) Foreign Application Priority Data

Aug. 31, 2006 (JP) ............................. 2006-235308

(51) Int. Cl.
*B62K 11/00* (2006.01)
*B62D 61/02* (2006.01)
(52) U.S. Cl. ....................... 180/227; 180/219
(58) Field of Classification Search ................ 180/219, 180/227, 228, 229
See application file for complete search history.

(56) References Cited

U.S. PATENT DOCUMENTS

| 4,485,885 | A | * | 12/1984 | Fukuchi | 180/227 |
|---|---|---|---|---|---|
| 4,813,697 | A | * | 3/1989 | Takada | 280/284 |
| 5,007,497 | A | * | 4/1991 | Trema | 180/219 |
| 5,531,289 | A | * | 7/1996 | Muramatsu | 180/227 |
| 6,182,994 | B1 | * | 2/2001 | Gogo et al. | 280/284 |
| 6,481,523 | B1 | * | 11/2002 | Noro et al. | 180/227 |
| 2005/0236206 | A1 | * | 10/2005 | Miyashiro | 180/227 |
| 2005/0284681 | A1 | * | 12/2005 | Satou | 180/227 |
| 2006/0290097 | A1 | * | 12/2006 | Kawamura et al. | 280/288 |
| 2008/0156565 | A1 | * | 7/2008 | Aoki | 180/227 |
| 2008/0196960 | A1 | * | 8/2008 | Brown et al. | 180/227 |

FOREIGN PATENT DOCUMENTS

| JP | 2003-312577 | | 11/2003 | | |
|---|---|---|---|---|---|
| JP | 2003312577 | A | * | 11/2003 | 180/227 |

* cited by examiner

*Primary Examiner*—Lesley Morris
*Assistant Examiner*—Marc A Scharich

(57) ABSTRACT

A swingarm assembly (12) for use in motorcycles for supporting a motorcycle rear wheel (13) includes left and right arms (23L, 23R) and a connecting member (24) by which the left and right arms (23L, 23R) are connected together. At least the arms (23L, 23R) are products of magnesium alloy that are formed by an extrusion technique or a drawing technique.

17 Claims, 4 Drawing Sheets

MOTORCYCLE SWINGARM ASSEMBLY

BACKGROUND OF THE INVENTION

1. Field of the Invention

The present invention relates to a motorcycle and, more particularly, to a swingarm assembly coupled pivotally with a motorcycle frame structure for the support of a motorcycle rear wheel.

2. Description of the Prior Art

In recent years, in an attempt to reduce the weight of the swingarm assembly used to support a motorcycle rear wheel, motorcycles, particularly those for use in motocross, make use of an aluminum alloy as material for the swingarm assembly. It has, however, been found that the sole use of the aluminum alloy as a material for the motorcycle swingarm assembly has its limit to further reduction in weight of the motorcycle swingarm assembly. Accordingly, an attempt has been made to use a motorcycle swingarm assembly of two piece construction including upper and lower swingarm subassemblies such as disclosed in, for example, the Japanese Laid-open Patent Publication No. 2003-312577, published Nov. 6, 2003. According to this publication, the lower swingarm subassembly is prepared from a casting of a magnesium alloy whereas the upper swingarm subassembly is prepared from a sheet of an aluminum alloy.

In this known swingarm assembly of the two piece construction discussed above, it is only the lower swingarm subassembly, not the swingarm assembly in its entirety, that is made of the magnesium alloy, which is known to be lighter than the aluminum alloy, and the lower swingarm subassembly is in the form of a cast product having a substantial wall thickness for the sake of physical strength. Accordingly, as compared with the standard motorcycle swingarm assembly made of the aluminum alloy, a substantial reduction in weight of the swingarm assembly would hardly be accomplished. Also, the casting of the magnesium alloy is unable to provide not only a pleasant feeling to texture, but also an aesthetic beauty.

SUMMARY OF THE INVENTION

In view of the foregoing, the present invention is intended to provide a swingarm assembly for use in motorcycles which is excellent in appearance and which can be manufactured lightweight while securing a required rigidity and strength.

In order to accomplish the foregoing object of the present invention, there is provided a swingarm assembly for use in motorcycles for supporting a motorcycle rear wheel, which includes left and right arms and a connecting member by which the left and right arms are connected together in side-by-side fashion. At least the arms of the swingarm assembly are prepared from a molding of a magnesium alloy that is formed by an extrusion technique or a drawing technique.

According to the present invention, since the left and right arms, which occupy a major portion of the swingarm assembly, are made of a magnesium alloy known to have a lower specific gravity than that of aluminum, and since each of the left and right arms is prepared from an extruded product or a drawn product, not a cast product to involve a relatively great wall thickness in terms of strength, the swingarm assembly can have a reduced weight. Also, because of the extruded product or the drawn product being used for the arms, the resultant swingarm assembly can provide a pleasant sensation of sight and, also, a pleasant feeling to texture.

In one preferable embodiment of the present invention, each of the arms is in the form of a tubular member having upper and lower walls and outer and inner side walls, the upper and inner side walls having a wall thickness greater than that of the lower and outer side walls. This is particularly advantageous in that a sufficient rigidity and strength can be secured on upper and inner sides of each of the arms, which is subjected to a relatively large load as a result of shocks imposed on the motorcycle during the travel of the latter.

It is to be noted that the terms "inner" and "outer" referred to above and hereinafter are intended to mean one side close to the widthwise center of the motorcycle and the other side away from the widthwise center.

Preferably, each of the arms may be in the form of a rectangular sectioned tube having a height greater than a width thereof. The use of the tube of a rectangular cross-sectional shape for each of the arms is effective to suppress any undesirable protrusion of the respective arm in a direction laterally outwardly of the motorcycle frame structure and, therefore, even in the motorcycle for use in motocross, which is subject to restriction in widthwise dimension, the inner dimension of the arms, which is required to allow the drive chain to extend, can be secured without departing from the restriction.

In another preferred embodiment of the present invention, the connecting member is made of a magnesium alloy and has opposite ends fixedly connected respectively with the arms. In this case, since the connecting member is made of the magnesium alloy, the swingarm assembly can have a further reduced weight.

The connecting member referred to above may include upper and lower walls, each fixedly connected with the corresponding arm, and a pair of upright walls connecting the upper and lower walls together. Also, each of the upright walls may have a lightening hole defined therein. Those features are effective to achieve a further reduction in weight of the swingarm assembly.

In a still further preferred embodiment of the present invention, a reinforcement plate is secured to the connecting member at a location substantially intermediate of a length of the connecting member as measured in a direction between the arms. Another reinforcement plate may be secured to a junction between each of the arms and a rear end face of the connecting member. The use of the reinforcement plate or plates is effective to increase the strength of each of the arms.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
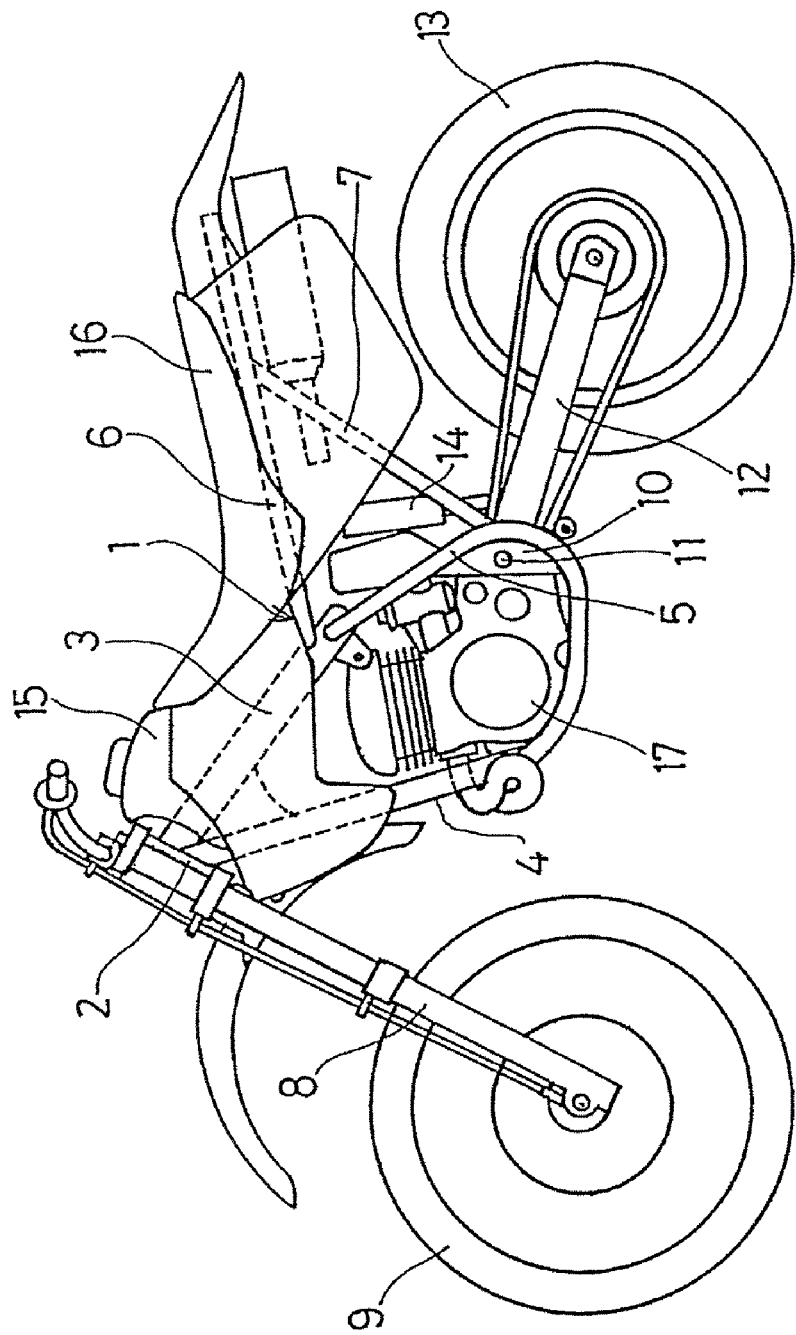
FIG. 1 is a side view of a motorcycle utilizing a swingarm assembly according to a preferred embodiment of the present invention.

Hereinafter, a preferred embodiment of the present invention will be described in detail with particular reference to the accompanying drawings. Specifically, FIG. 1 illustrates a side view of a motorcycle utilizing a swingarm assembly according to the embodiment of the present invention. As shown therein, the motorcycle includes a motorcycle frame structure 1 made up of a steering head 2, a main upper member 3 extending from the steering head 2 in a direction rearwardly (diagonally downwardly in the illustrated structure), a main lower member 4 extending generally downwardly from the steering head 2 and then curved to extend rearwardly of the motorcycle, left and right main rear members 5 for connecting respective rear ends of the main upper and lower members 3 and 4 together, left and right seat rails 6 extending rearwardly from the main upper member 3 at a portion adjacent the rear end thereof, left and right rear support members 7 for connecting the main rear members 5 and generally intermediate portions of the seat rails 6, and a plurality of cross members (not shown) for connecting the forementioned respective left and right members 5, 6 and 7 together at appropriate locations.

It is to be noted that the terms "left" and "right" referred to hereinbefore and hereinafter are to be understood as meaning a direction or position relative to the longitudinal sense of the motorcycle as viewed by a motorcycle rider.

A motorcycle front wheel 9 is rotatably supported by a front fork 8 that is steerablely mounted on the steering head 2 for angular movement about the longitudinal axis of the steering head 2. Each of the main rear members 5 referred to above has a swingarm assembly bracket 10 fixedly mounted thereon. A pivot pin 11 is supported by a pair of the brackets 10 and 10. A swingarm assembly 12 has a base end rotatably mounted on the pivot pin 11 and also has bifurcated rear ends on which a motorcycle rear wheel 13 is rotatably supported.

A mono-suspension unit 14, which is a shock absorber for cushioning a load imposed on the motorcycle rear wheel 13, is disposed between the swingarm assembly 12 and the motorcycle frame structure 1. Also, a fuel tank 15 and a seat assembly 16 are mounted on the main upper member 3 and the seat rails 6, with the fuel tank 15 positioned forwardly of the seat assembly 16. A combustion engine 17 is mounted on the motorcycle frame structure 1 and positioned within a space encompassed by the main upper member 3, the main lower member 4 and the main rear members 5.

Figure 2:
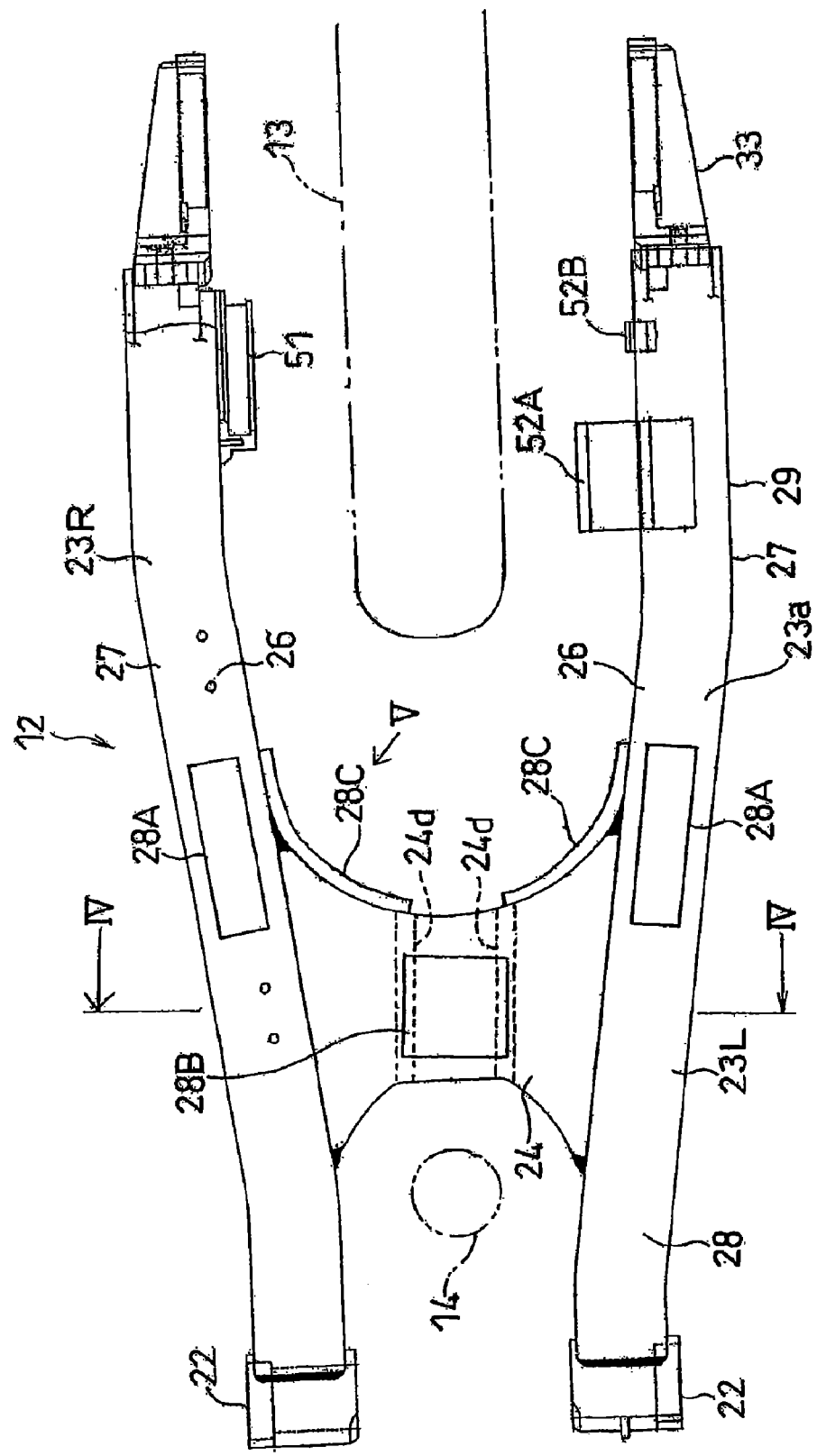
FIG. 2 is a top plan view of the motorcycle swingarm assembly of the present invention.

The motorcycle swingarm assembly 12 is shown in a plan view in FIG. 2. The swingarm assembly 12 shown therein is used to rotatably support the motorcycle rear wheel 13 and has pivot bushings 22 at a front end thereof, each pivot bushing 22 being rotatably mounted on the pivot pin 11 in the motorcycle frame structure 1 shown in FIG. 1. This swingarm assembly 12 in its entirety is made of a magnesium alloy of a composition containing, for example, 3% aluminum, 1% zinc and the remainder being magnesium and includes, as best shown in FIG. 2, left and right arms 23L and 23R and a connecting member 24 connecting the arms 23L and 23R together in side-by-side relation to each other. The pivot bushings 22 referred to above are welded to respective front ends of the left and right arms 23L and 23R by means of a welding technique. One of the arms, for example, the right arm 23R so far shown in FIG. 2, has a brake torque bracket 51 fitted thereto at a location adjacent a rear end thereof.

Each of the arms 23L and 23R is prepared by bending an extruded or drawn, rectangular sectioned tube so as to have an outwardly-bulging curved portion 27 defined at a generally intermediate portion 26 thereof, with the spacing between the curved portions 27 of those arms 23L and 23R being greater than that between the front ends thereof.

Figure 3:
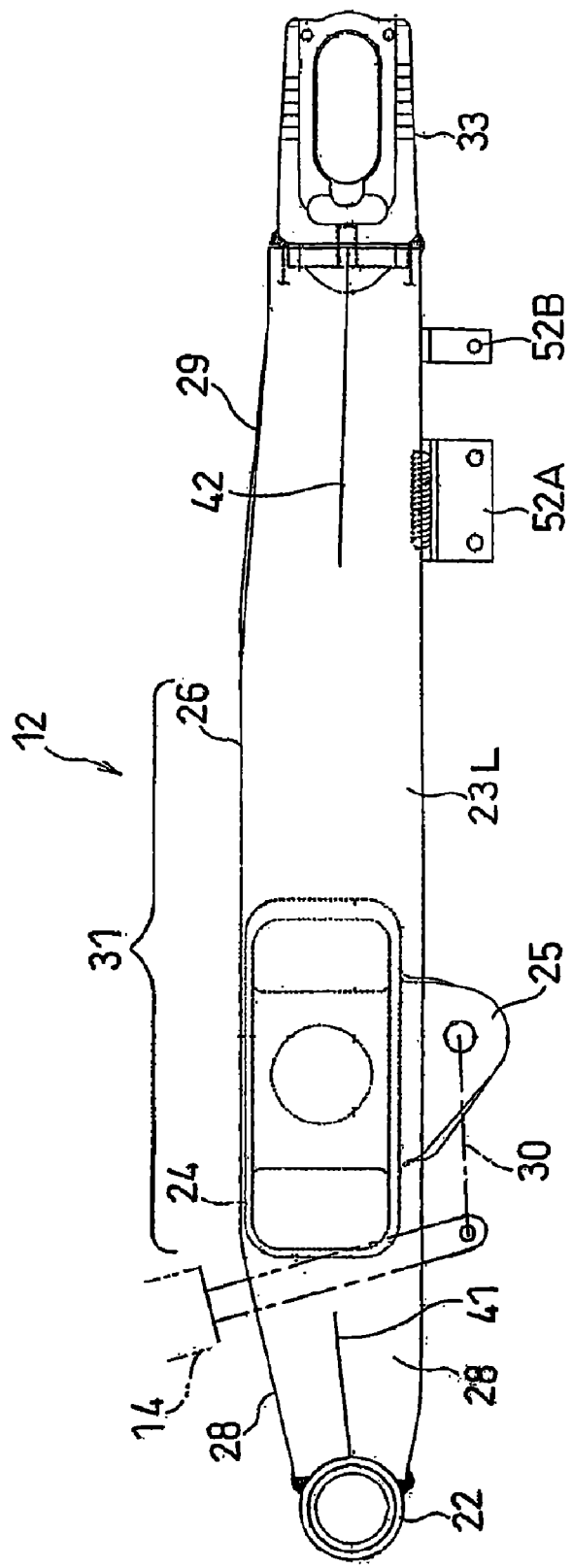
FIG. 3 is a side view of the motorcycle swingarm assembly shown in FIG. 2.

Referring particularly to FIG. 3, each of the arms 23L and 23R has a rearwardly downwardly tapered rear end portion 29 defined therein so as to extend from at least the generally intermediate portion 26 to the rear end thereof with the height thereof progressively decreasing in a direction rearwardly of the motorcycle. Also, one of the arms, for example, the arm 23L so far shown in FIG. 2, has two chain guide brackets 52A and 52B secured thereto at a location adjacent the rear ends thereof. A portion of each of the arm 23L and 23R, which extends from the generally intermediate portion 26 thereof to a position adjacent the front end thereof, is represented by a straight section 31 having an uniform cross-sectional shape, i.e., a cross-sectional shape that does not vary, over the length thereof. This straight section 31 continues to a front end portion of the respective arm 23L or 23R, which is tapered forwardly to define a tapered front end portion 28 with the height thereof progressively decreasing in a direction forwardly of the motorcycle. Each arm 23L or 23R in the form of the rectangular sectioned tube has the rear end opening outwardly, and a respective end piece 33 for the support of an axle of the motorcycle rear wheel is inserted in the rear end opening and welded to the corresponding arm 23L or 23R.

It is to be noted that each of the tapered front and rear end portion 28 and 29 of each arm 23L or 23R is formed by, for example, forming straight cutouts 41 or 42 in opposite side walls of the rectangular sectioned tube, respectively, so as to extend a required distance from the end opening inwardly and pressing portions of the rectangular sectioned tube from above and below to substantially close the corresponding straight cutouts 41 or 42. Each of the left and right arms 23L and 23R, however, has a width uniform over the entire length thereof as best shown in FIG. 2.

Figure 4:
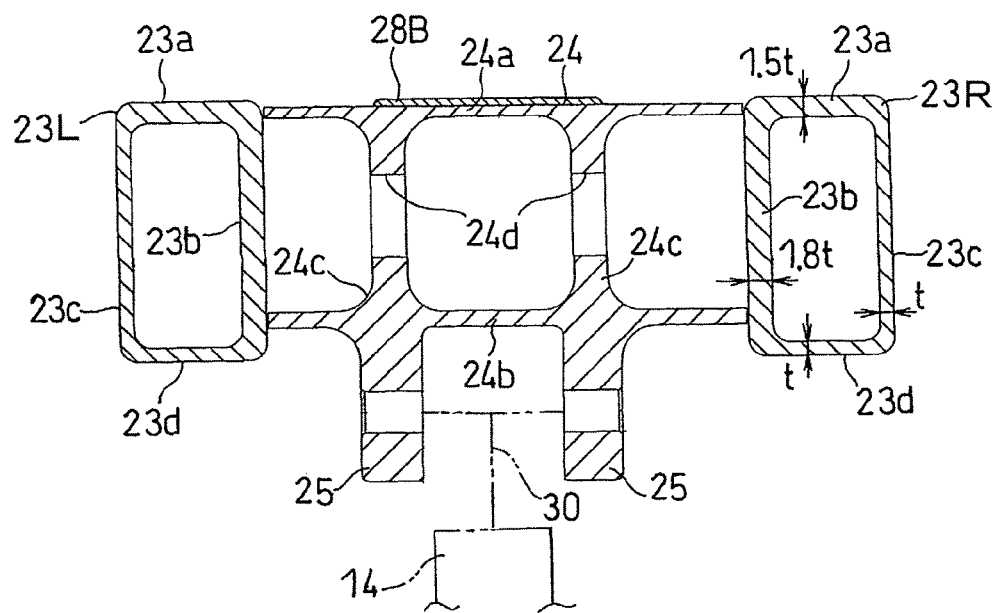
FIG. 4 is a cross-sectional view, on an enlarged scale, taken along the line IV-IV in FIG. 2.

FIG. 4 illustrates a cross-sectional representation taken along the line IV-IV in FIG. 2. As shown therein, the connecting member 24 used to connect the arms 23L and 23R together in a manner as will now be described is of one-piece construction made of a magnesium alloy. Specifically, the connecting member 24 may be in the form of an extruded product or drawn product of a magnesium alloy, which product is subsequently machined to the intended shape, but it may be prepared from a casting of a magnesium alloy. This connecting member 24 has its opposite, left and right ends rigidly connected with to the left and right arms 23L and 23R, respectively, by means of welding, with weld beads formed between mating faces thereof.

More specifically, the connecting member 24 includes a top wall 24a connected at its opposite ends with the left and right arms 23L and 23R, a bottom wall 24b similarly connected at its opposite ends with the left and right arms 23L and 23R, a pair of upright walls 24c connecting the top and bottom walls 24a and 24b together in a parallel spaced relation to each other, and mounting brackets 25 positioned respectively below the upright walls 24c so as to protrude downwardly therefrom. The mono-suspension unit 14 referred to previously and shown in FIG. 1 has a lower end connected between the mounting brackets 25 by means of a link mechanism 30. Also, for the purpose of reducing the weight of the connecting member 24, each of the upright walls 24c of the connecting member 24 is formed with a corresponding lightening hole 24d that communicates with a center space delimited by the top and bottom walls 24a and 24b and the upright walls 24c.

Each of the left and right arms 23L and 23R is made up of horizontally lying upper and lower walls 23a and 23d and vertically lying inner and outer side walls 23b and 23c, which are so assembled as to render the respective arm 23L or 23R to represent a rectangular box-shaped configuration having a height greater than the width, with upper and lower horizontal outer surfaces, as well as inner and outer side vertical outer surfaces. Also, the upper and inner side walls 23a and 23b of each of the arm 23L and 23R preferably have a wall thickness greater than that of the outer side wall and lower wall 23c and 23d over the substantially entire length thereof. In the illustrated embodiment, for, example, assuming that each of the outer side wall 23c and the lower wall 23d has a wall thickness t, the upper wall 23a and the inner side wall 23b preferably have a wall thickness expressed by 1.5 t and 1.8 t, respectively. It is to be noted that this specific relation in wall thickness of the walls of each arm 23L and 23R varies in dependence on a particular model of the motorcycle to which the present invention is applied.

In practice, the arms 23L and 23R of the swingarm assembly 12, particularly the upper walls 23a of the arms 23L and 23R, tend to be loaded with a relatively large compressive load by the effect of a generally vertically acting bending force transmitted thereto through the mono-suspension unit 14, coupled with the mounting brackets 25 integral with lower portions of the upright walls 24c of the connecting member 24 as shown in FIG. 4, and the end pieces 33 for the support of the motorcycle rear wheel 13 (FIG. 1). However, while the magnesium alloy generally has a low compressive strength, selection of the relatively great wall thickness for the upper wall 23a, which is 1.5 times the wall thickness of each of the outer side wall 23c and the lower wall 23d is effective to increase the strength against the relatively large compressive load.

Similarly, in practice, a relatively large load acts through the connecting member 24 on the inner side wall 23b of each of the left and right arms 23L and 23R. However, selection of the wall thickness of the inner side wall 23b to a value that is 1.8 times the wall thickness of each of the outer side wall 23c and the lower wall 23d is also effective to increase the strength against this load.

Accordingly, in order for the walls 23a to 23d of each arm 23L and 23R to have a balanced rigidity and strength, the upper wall 23a has a wall thickness preferably within the range of 1.2 t to 1.8 t and, more preferably, within the range of 1.3 t to 1.7 t and the inner side wall 23b has a wall thickness preferably within the range of 1.5 t to 2.1 t and, more preferably, within the range of 1.6 to 2.0 t.

As best shown in FIG. 2, a reinforcement plate 28A is welded to an upper surface of the upper wall 23a of each arm 23L and 23R; a reinforcement plate 28B is welded to an upper surface of the connecting member 24; and a reinforcement plate 28C is welded to an inner side wall 23b of each arm 23L and 23R and a rear end face of the connecting member 24 so as to straddle a junction between the connecting member 24 and the corresponding arm 23L and 23R. The reinforcement plates 28A each in the form of a flat plate are positioned on respective portions of the upper walls 23a of the arms 23L and 23R in the vicinity of the junctions between the connecting member 24 and the corresponding arms 23L and 23R, so that the respective upper walls 23a of the left and right arms 23L and 23R, where the relatively large compressive load acts in the manner described hereinabove, can be reinforced. Also, the reinforcement plate 28B is positioned at location generally intermediate of the connecting member 24 in a direction widthwise thereof so as to extend between the upright walls 24c to thereby reinforce the connecting member 24 effectively.

Figure 5:
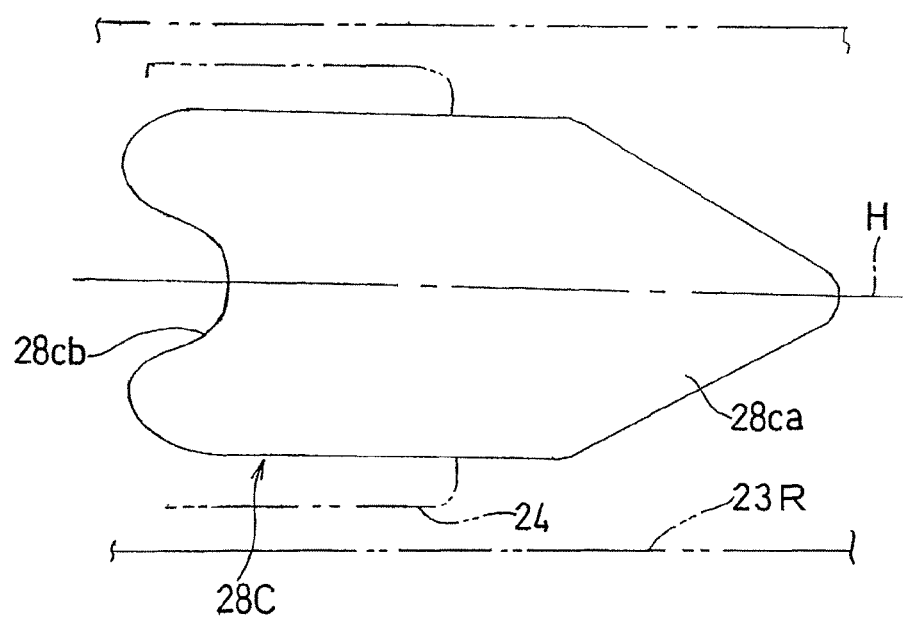
FIG. 5 is an illustration, on an enlarged scale, of a reinforcement plate when viewed in the direction shown by arrow V in FIG. 2.

Each of the reinforcement plates 28C is fixed in part to the rear end face of the connecting member 24 and in part to the inner side wall 23b of the associated arm 23L and 23R, while straddling the junction between the connecting member 24 and the arm 23L and 23R. As best shown in FIG. 5, each reinforcement plate 28C is of a configuration having a longitudinal center line H extending in a direction lengthwise thereof and includes a rear end portion, which is so tapered towards the adjacent arm 23L or 23R as to represent a generally or substantially triangular shape 28ca with the vertical dimension thereof progressively decreasing in the rearward direction, and a front end portion which is formed with an inwardly extending recess 28cb. After the reinforcement plate 28C has been positioned with the longitudinal center line H aligned with a horizontal center line of the connecting member 24 which extend intermediate of the height of the connecting member 24 as measured generally between the top and bottom walls 24a and 24b thereof and has then been bent to follow a curvature of the connecting member 24 and also that of the adjacent arm 23L or 23R as shown in FIG. 2, the reinforcement plate 28C is fixed in part to the connecting member 24 and in part to the associated arm 23L and 23R with a weld deposit formed along a peripheral edge of the reinforcement plate 28C. By so doing, the junctions between the connecting member 24 and the left and right arms 23L and 23B, where stresses tend to concentrate as a result of the load of the mono-suspension unit 14 can be reinforced satisfactorily.

According to the preferred embodiment described in detail hereinabove, it is clear that since the left and right arms 23L and 23R, which occupy a majority of the swingarm assembly 12 shown in FIG. 2, is made of the magnesium alloy known to have a lower specific gravity than that of aluminum, and since each of the left and right arms 23L and 23R is prepared from an extruded product or a drawn product, not a casting tending to involve a relatively great wall thickness in terms of strength, the swingarm assembly 12 can have a reduced weight. Also, because of the extruded product or the drawn product being used for the arms 23L and 23R, the resultant swingarm assembly 12 can provide a pleasant sensation of sight and, also, a pleasant feeling to texture.

Considering that the upper and inner side walls 23a and 23b of each of the left and right arms 23L and 23R as shown in FIG. 4 are so designed as to have a wall thickness greater than that of the outer side and lower walls 23c and 23d thereof, both of the upper wall 23a, on which a relatively large load is imposed as a result of impact transmitted from the road surface, and the inner side wall 23b, on which the load is imposed from the mono-suspension unit 14, can have a sufficient rigidity and a sufficient strength. In addition, the arms 23L and 23R, the connecting member 24 and the junctions between the arms 23L and 23R and the connecting member 24 are provided with the reinforcement plates 28A, 28B and 28C respectively, in the manner as hereinbefore described in detail for the purpose of reinforcement, the required rigidity and strength can be increased. Considering, however, that reinforcement accomplished by the use of those reinforcement plates 28A to 28c is applied to specifically limited sites as hereinbefore described, reduction in weight of the swingarm assembly 12 is never hampered.

Yet, since each of the left and right arms 23L and 23R is employed in the form of a tube having a rectangular sectioned configuration having the inner and outer side walls 23b and 23c of a width greater than that of the upper and lower walls 23a and 23d as clearly shown in FIG. 4, any protrusion of the outer surface of each arm 23L or 23R in a direction laterally outwardly of the motorcycle frame structure 1 can be suppressed and, accordingly, even in the motorcycle for use in motocross, which is subject to restriction in widthwise dimension, the inner dimension of the arms, which is required to allow the drive chain to extend, can be secured without departing from the restriction. Also, since the connecting member 24 is also made of a magnesium alloy, further reduction in weight of the swingarm assembly 12 can be accomplished.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the foregoing description each of the arms 23L and 23R has been shown and described as employed in the form of a rectangular sectioned tube, the cross-sectional shape thereof may not be limited thereto, but may be generally D-shaped or oval with its major axis lying vertically.

Accordingly, such changes and modifications are, unless they depart from the scope of the present invention as delivered from the claims annexed hereto, to be construed as included therein.

What is claimed is:

1. A swingarm assembly for use in motorcycles for supporting a motorcycle rear wheel, which comprises:
    left and right arms,
    pivot bushings connected to respective front ends of the left and right arms, each pivot bushing being rotatably mounted on a pivot pin of a motorcycle frame structure;
    end pieces connected to respective rear ends of the left and right arms for supporting an axle of the motorcycle rear wheel; and
    a connecting member by which the left and right arms are connected together at respective intermediate portions thereof,
    wherein at least the left and right arms are formed from a magnesium alloy, and
    wherein each of the left and right arms is in the form of a tubular member having upper and lower walls and laterally outer and inner side walls, at least one of the following conditions (i) and (ii) is met:
        (i) in a cross sectioned view, the upper wall having a wall thickness greater than that of the lower wall,
        (ii) in a cross sectioned view, the laterally inner side wall having a wall thickness greater than that of the laterally outer side wall.

2. The swingarm assembly for use in motorcycles as claimed in claim 1, wherein the connecting member comprises top and bottom walls, each fixedly connected with the left and right arms, and a pair of upright walls connecting the top and bottom walls together.

3. The swingarm assembly for use in motorcycles as claimed in claim 2, wherein each of the upright walls has a weight reducing hole defined therein.

4. The swingarm assembly for use in motorcycles as claimed in claim 2, further comprising a pair of mounting brackets positioned below the upright walls and extending downwardly therefrom for supporting a lower end of a suspension unit which has an upper end supported by the motorcycle frame structure.

5. The swingarm assembly for use in motorcycles as claimed in claim 1, wherein each of the left and right arms comprises, in a cross section view, a rectangular tube having a height greater than a width thereof.

6. The swingarm assembly for use in motorcycles as claimed in claim 1, wherein the connecting member is made of a magnesium alloy and has opposite ends fixedly connected respectively with the left and right arms.

7. The swingarm assembly for use in motorcycles as claimed in claim 1, wherein the connecting member is positioned rearward of a shock absorber for cushioning a load imposed on the motorcycle rear wheel.

8. The swingarm assembly for use in motorcycles as claimed in claim 1, further comprising a reinforcement plate connected to an upper surface of an upper wall of each of the left and right arms in the vicinity of a junction with the connecting member.

9. The swingarm assembly for use in motorcycles as claimed in claim 1, wherein the left and right arms are symmetrical with respect to a longitudinal center line of the motorcycle frame structure.

10. The swingarm assembly for use in motorcycles as claimed in claim 1, wherein each of the left and right arms is formed by a single tube.

11. The swingarm assembly for use in motorcycles as claimed in claim 1, further comprising a reinforcement plate secured to the connecting member at a location substantially intermediate of a width of the connecting member as measured in a direction between the left and right arms.

12. The swingarm assembly for use in motorcycles as claimed in claim 1, further comprising a reinforcement plate secured to a junction between each of the left and right arms and a rear end face of the connecting member.

13. A swingarm assembly for use in motorcycles for supporting a motorcycle rear wheel, which comprises:
    left and right arms;
    pivot bushings connected to respective front ends of the left and right arms, each pivot bushing being rotatably mounted on a pivot pin of a motorcycle frame structure;
    end pieces connected to respective rear ends of the left and right arms for supporting an axle of the motorcycle rear wheel; and
    a connecting member by which the left and right arm pieces are connected together at respective intermediate portions thereof,
    wherein each of the left and right arms is in the form of a tubular member having upper and lower walls and laterally outer and inner side walls, the upper and inner side walls having a wall thickness greater than that of the lower and laterally outer side walls.

14. A swingarm assembly for use in motorcycles for supporting a motorcycle rear wheel, which comprises:
    left and right arms;
    pivot bushings connected to respective front ends of the left and right arms, each pivot bushing being rotatably mounted on a pivot pin of a motorcycle frame structure;
    end pieces connected to respective rear ends of the left and right arms for supporting an axle of the motorcycle rear wheel; and
    a connecting member by which the left and right arm pieces are connected together at respective intermediate portions thereof,
    wherein at least the left and right arms are products of magnesium alloy, and
    wherein each of the left and right arms is in the form of a rectangular tube having upper and lower walls, and in a cross sectioned view, the upper wall has a wall thickness greater than that of the lower wall.

15. A swingarm assembly for use in motorcycles for supporting a motorcycle rear wheel, which comprises:
   left and right arms;
   pivot bushings connected to respective front ends of the left and right arms, each pivot bushing being rotatably mounted on a pivot pin of a motorcycle frame structure;
   end pieces connected to respective rear ends of the left and right arms for supporting an axle of the motorcycle rear wheel; and
   a connecting member by which the left and right arm pieces are connected together at respective intermediate portions thereof,
   wherein at least the left and right arms are products of magnesium alloy, and
   wherein each of the left and right arms is in the form of a rectangular tube having laterally outer and inner side walls, and in a cross sectioned view, the laterally inner side wall has a wall thickness greater than that of the laterally outer side wall.

16. A swingarm assembly for use in motorcycles for supporting a motorcycle rear wheel, which comprises:
   left and right arms;
   pivot bushings connected to respective front ends of the left and right arms, each pivot bushing being rotatably mounted on a pivot pin of a motorcycle frame structure;
   end pieces connected to respective rear ends of the left and right arms for supporting an axle of the motorcycle rear wheel; and
   a connecting member by which the left and right arms are connected together at respective intermediate portions thereof,
   wherein at least the left and right arms are products of magnesium alloy, and
   wherein each of the left and right arms has upper and lower walls, and in a cross sectioned view, the upper wall has a wall thickness greater than that of the lower wall.

17. A swingarm assembly for use in motorcycles for supporting a motorcycle rear wheel, which comprises:
   left and right arms;
   pivot bushings connected to respective front ends of the left and right arms, each pivot bushing being rotatably mounted on a pivot pin of a motorcycle frame structure;
   end pieces connected to respective rear ends of the left and right arms for supporting an axle of the motorcycle rear wheel; and
   a connecting member by which the left and right arm pieces are connected together at respective intermediate portions thereof,
   wherein at least the left and right arms are products of magnesium alloy, and
   wherein each of the left and right arms has laterally outer and inner side walls, and in a cross sectioned view, the laterally inner side wall has a wall thickness greater than that of the laterally outer side wall.

* * * * *